(12) United States Patent
Lee

(10) Patent No.: US 7,469,022 B2
(45) Date of Patent: Dec. 23, 2008

(54) METHODS AND APPARATUS FOR SYMMETRICAL PHASE-SHIFT KEYING

(75) Inventor: Chin Lee, Xindian (TW)

(73) Assignee: Via Technologies, Inc., Taipei (TW)

( * ) Notice: Subject to any disclaimer, the term of this patent is extended or adjusted under 35 U.S.C. 154(b) by 723 days.

(21) Appl. No.: 10/996,676

(22) Filed: Nov. 23, 2004

(65) Prior Publication Data

US 2006/0109933 A1    May 25, 2006

(51) Int. Cl.
    *H04L 27/20*    (2006.01)

(52) U.S. Cl. .................. 375/308; 375/329; 375/332; 375/302; 375/330; 375/324; 375/331; 375/316; 329/308; 329/304

(58) Field of Classification Search ............. 375/308, 375/329, 332, 265, 222, 302, 330, 324, 316, 375/331; 365/200; 329/307, 308, 304
See application file for complete search history.

(56) References Cited

U.S. PATENT DOCUMENTS

| | | | | |
|---|---|---|---|---|
| 4,760,344 A | * | 7/1988 | Takase et al. | 329/307 |
| 4,933,958 A | * | 6/1990 | Brandl et al. | 375/331 |
| 5,642,384 A | | 6/1997 | Ramesh | 375/265 |
| 2004/0076047 A1 | * | 4/2004 | Cho et al. | 365/200 |
| 2005/0008101 A1 | * | 1/2005 | Kazi et al. | 375/330 |
| 2005/0135507 A1 | * | 6/2005 | Chang et al. | 375/316 |

OTHER PUBLICATIONS

"Trellin-Coded Modulation with Redundant Signal Sets Part I: Introduction" Ungerboeck; Feb. 1987.
"Trellis-Coded Modulation with Redundant Signal Sets Part II: State of the Art" Ungerboeck; 1987.
"Design and Performance of Precompensated Frequency Modulation (PFM) for use with a Quasi-Synchronous CDMA Return Link" Crozier, et al.
"Nachrichtenubertragung" Kammeyer; 1993.

* cited by examiner

*Primary Examiner*—Chieh M. Fan
*Assistant Examiner*—Eva Puente
(74) *Attorney, Agent, or Firm*—Thomas, Kayden, Horstemeyer & Risley

(57) ABSTRACT

Methods and apparatuses employing symmetrical phase-shift keying (SPSK) for data modulation and demodulation. Each symbol in a transmission signal carries n-bit information and is transmitted with one of $2^{n+1}$ directions. Half directions among the $2^{n+1}$ directions are regarded as default directions and the remaining are regarded as complementary directions. Each default direction has a corresponding complementary direction with a phase difference of $\pi$ and representing the same n-bit information as the default direction. The phase difference between any two successive symbols after modulation is less than or equal to $\pi/2$.

22 Claims, 7 Drawing Sheets

| | | | |
|---|---|---|---|
| (0,0) right → | (0,1)right | (0,1)right | |
| | (1,0)right | (1,0)right | |
| | (1,1)right | (1,1)right | |
| | (0,0)right | (0,0)right | |
| | (0,0)left | N/A | (0,1)right |
| | (1,0)left | N/A | (1,1)right |
| | (0,1)left | N/A | (0,1)right |
| | (1,1)left | N/A | (1,1)right |
| (1,0) right → | (0,1)right | (0,1)right | |
| | (1,0)right | (1,0)right | |
| | (1,1)right | (1,1)right | |
| | (0,0)right | (0,0)right | |
| | (0,0)left | N/A | (0,1)right |
| | (1,0)left | N/A | (1,1)right |
| | (0,1)left | N/A | (0,1)right |
| | (1,1)left | N/A | (1,1)right |
| (1,1) right → | (0,1)right | N/A | (0,0)right |
| | (1,0)right | (1,0)right | |
| | (1,1)right | (1,1)right | |
| | (0,0)right | (0,0)right | |
| | (0,0)left | N/A | (0,0)right |
| | (1,0)left | (0,1)right | |
| | (0,1)left | N/A | (0,1)right from(1,0)left |
| | (1,1)left | N/A | (0,1)right from(1,0)left |
| (0,1) right → | (0,1)right | (0,1)right | |
| | (1,0)right | (1,0)right | |
| | (1,1)right | N/A | (1,0)right |
| | (0,0)right | (0,0)right | |
| | (0,0)left | (1,1)right | |
| | (1,0)left | N/A | (1,0)right |
| | (0,1)left | N/A | (1,1)right from(0,0)left |
| | (1,1)left | N/A | (1,1)right from(0,0)left |

FIG. 8a

METHODS AND APPARATUS FOR SYMMETRICAL PHASE-SHIFT KEYING

BACKGROUND

The present invention relates to modulation of data transmission, more specifically, to phase-Shift Keying (PSK).

Digital modulation converts digital data to analog symbols for physical transmission in digital communication, with digital demodulation as the reverse process. The modulation process, enabling the transmission involves switching (keying) the amplitude, frequency, or phase of a sinusoidal carrier in some fashion in accordance with the incoming digital data. Basic signaling schemes are amplitude-shift keying (ASK), frequency-shift keying (FSK), and phase-shift keying (PSK). Both PSK and FSK signals have a constant envelope, and because of this property, are impervious to amplitude nonlinearities, commonly encountered in the communication channels. PSK and FSK signals are preferred to ASK signals for data transmission over nonlinear channels.

Gaussian-prefiltered Minimum Shift Keying and $\pi/4$ (quarter pi) QPSK (quaternary phase shift keying) are common digital mobile modulation/demodulation methods in Europe and United Sates respectively, with $\pi/4$ Differential QPSK (DQPSK) adopted by IS-54 (TDMA CDMA), PACS (Low power) and PHS in the current market. Common PSK methods include Binary Phase Shift Keying (BPSK), QPSK and its variants.

FIG. 1 is a BPSK constellation diagram showing that each bit may be transmitted by varying the phase according to its value. Positions corresponding to phase=0 and phase=$\pi$ on the BPSK constellation diagram differentiate the bit as logic high or logic low. FIG. 2 illustrates an example of six bits transmitted by the BPSK method, with a whole cycle of cosine wave corresponding to logic low (0), and a whole cycle of negative cosine wave corresponding to logic high (1). Note that there is an 180° ($\pi$) phase change whenever the bit value changes from 0 to 1 or 1 to 0, with a sharp phase change resulting in a spiky pulse in the time domain, requiring high transmission frequency and wider bandwidth, undesirable in the communication system.

FIG. 3 is a QPSK constellation diagram, wherein each symbol carries 2 bits of information, and is $\pi/2$ (90°) out of phase with its neighbors. FIG. 4 illustrates that the maximum phase change between consecutive symbols in QPSK is also $\pi$ (180°), which creates the same bandwidth problem as BPSK.

$\pi/4$ QPSK is another modulation alternative which further divides the constellation diagram into eight directions, but the number of bits transmitted per symbol remains two. Since an additional bit differentiates the eight directions as either odd or even. FIG. 5 is a constellation diagram for $\pi/4$ QPSK, wherein the phases 0, $\pi/4$, $\pi/2$, $3\pi/4$, $\pi$, $-3\pi/4$, $-\pi/2$, and $-\pi/4$ correspond to (0,0) even, (0,0) odd, (1,0) even, (1,0) odd, (1,1) even, (1,1) odd, (0,1) even, and (0,1) odd respectively. Pairs with the same bit information are grouped next to each other with a phase difference of $\pi/4$, with no two "odd" or two "even" symbols next to each other. The system transmits symbols alternating between even and odd, so that the largest possible phase difference between two consecutive symbols is reduced to $3\pi/4$. The greater the phase difference in the time domain, the sharper the pulse at the transition of two symbols, thereby requiring a broader spectrum in the frequency domain. It is crucial to keep the bandwidth as narrow as possible in order to employ the limited spectrum resources efficiently. Communication quality degrades if the bandwidth required by the transmitted signal exceeds its assigned channel bandwidth, causing interference with other signals.

SUMMARY

Methods and apparatuses employing symmetrical phase-shift keying (SPSK) for data modulation and demodulation are provided. Each symbol in a transmission signal carries n-bit information and is transmitted with one of $2^{n+1}$ directions. $2^n$ directions among the $2^{n+1}$ directions are regarded as default directions and the rest $2^n$ directions are regarded as complementary directions. Each default direction has a corresponding complementary direction at a phase difference of $\pi$, representing the same n-bit information as the default direction.

In a method, one of the default directions corresponding to a current symbol of the transmission signal is retrieved, with a phase difference between the retrieved default direction and a previous direction of a previous symbol in the transmission signal determined. The current symbol is transmitted according to the retrieved default direction if the phase difference is less than or equal to $\pi/2$, or the current symbol is transmitted according to a complementary direction corresponding to the retrieved default direction.

A previous direction of a previous symbol in the transmission signal is recorded for comparison, having $2^n$ allowable transition directions, at a phase difference from the previous direction less than $\pi/2$ or with default direction with a phase difference from the previous direction equaling $\pi/2$. A current symbol with a current direction among the $2^{n+1}$ directions is checked if the current direction is among the $2^n$ allowable transition directions. The current direction is corrected to a most possible allowable direction among the $2^n$ allowable transition directions if the current direction is not among the $2^n$ allowable transition directions. The current symbol is decoded to corresponding n-bit information according to the current direction. The most possible allowable direction among the $2^n$ allowable transition directions is defined as the closest direction to the current direction not belonging to the $2^n$ allowable transition directions.

SPSK modulator comprises a symmetrical phase encoder, a delay circuit, and a modulator. The symmetrical phase encoder generates a current direction among the $2^{n+1}$ directions for a n-bit current symbol according to a phase difference between the current direction and a previous direction of a previous symbol. The current direction is assigned according to a default direction corresponding to the n-bit current symbol if the phase difference is less than or equal to $\pi/2$, or the current direction is assigned according to a complementary direction corresponding to the default direction. The delay circuit provides the previous direction to the symmetrical phase encoder by delaying the output of the symmetrical phase encoder. The modulator receives the current direction from the symmetrical phase encoder and modulates the current direction into a signal for transmission by phase-shift keying.

SPSK demodulator comprises a demodulator, a delay circuit, and a reverse circuit. The demodulator demodulates the received signal into (n+1) bit symbols. The delay circuit is coupled to the demodulator. The reverse circuit receives a current symbol from the demodulator and a previous symbol from the delay circuit. The previous direction of the previous symbol has $2^n$ allowable transition directions, having a phase difference from the previous direction of less than $\pi/2$ or a default direction with a phase difference from the previous direction of $\pi/2$. The reverse circuit also corrects the current direction to a most possible direction if the current direction is not one of the $2^n$ allowable transition directions, and decodes the current symbol to corresponding n-bit information according to the current direction.

DESCRIPTION OF THE DRAWINGS

The present invention can be more fully understood by reading the subsequent detailed description in conjunction with the examples and references made to the accompanying drawings, wherein:

FIGS. 8a and 8b show possible combinations for data demodulation according to embodiments of the invention.

DETAILED DESCRIPTION

Figure 1:
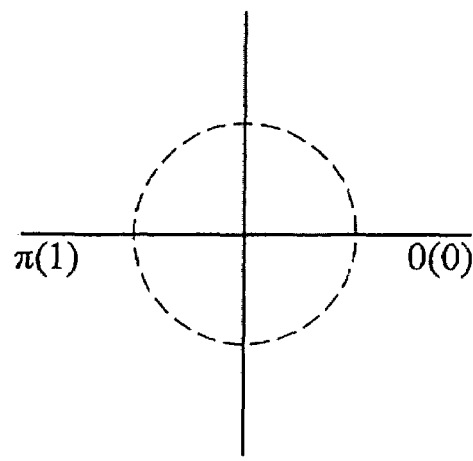
FIG. 1 is a constellation diagram of BPSK.
Figure 2:
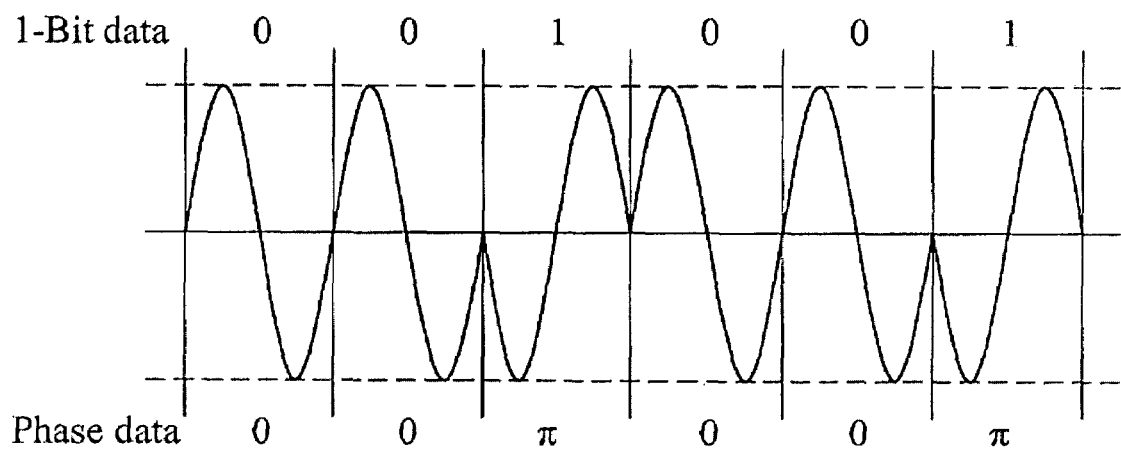
FIG. 2 illustrates an exemplary signal waveform transmitted using BPSK.
Figure 3:
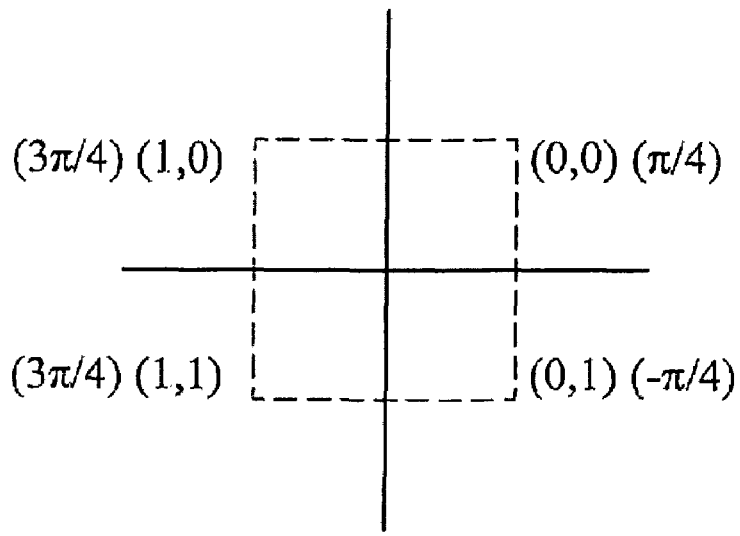
FIG. 3 is a constellation diagram of QPSK.
Figure 4:
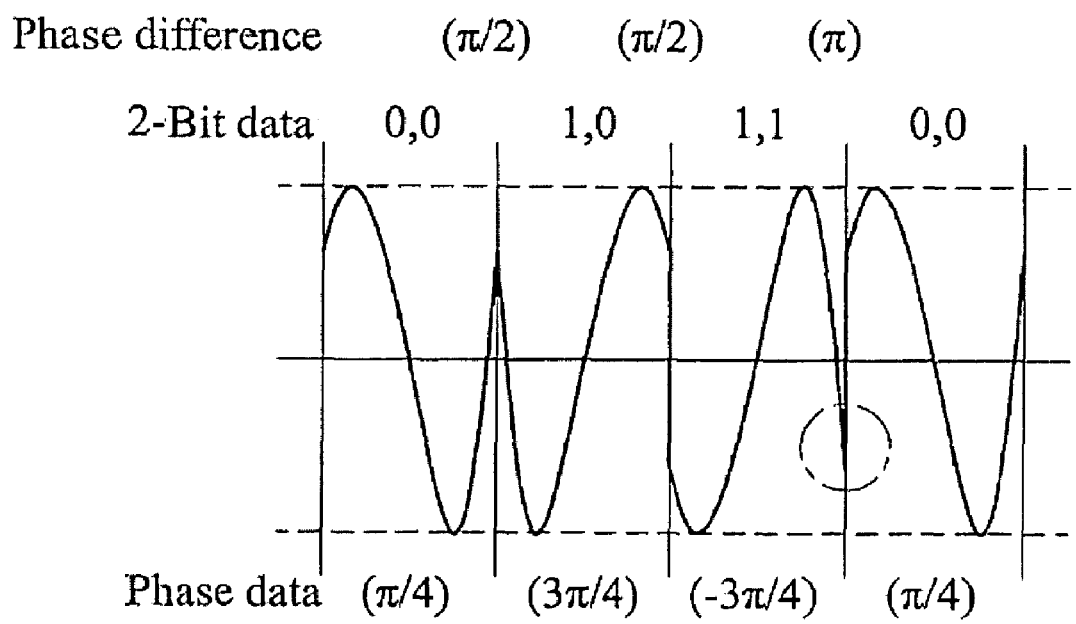
FIG. 4 illustrates an exemplary signal waveform transmitted using QPSK.
Figure 5:
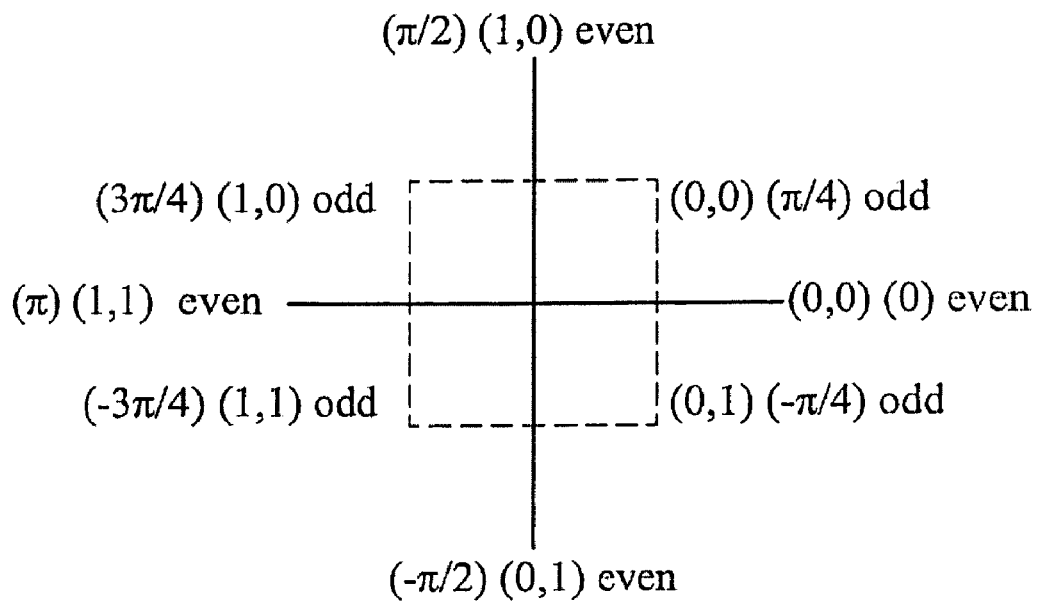
FIG. 5 is a constellation diagram of $\pi/4$ QPSK.
Figure 6:
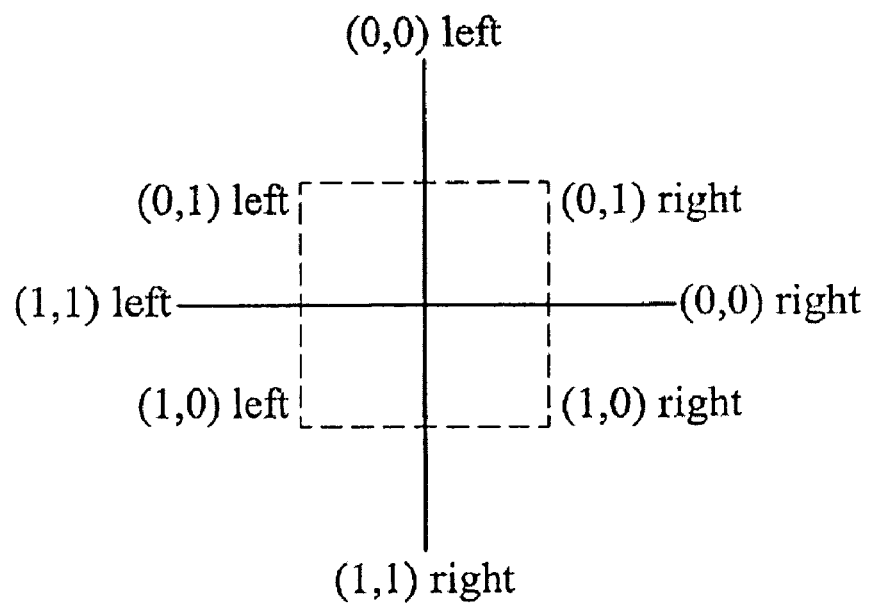
FIG. 6 is a constellation diagram of SPSK according to embodiments of the invention.

FIG. 6 illustrates a constellation diagram of SPSK according to embodiments of the invention. In FIG. 6, 8 directions each represent 2-bit information and 1-bit indicators of either left or right. The 4 directions with a "right" indicator are regarded as default directions, and the 4 directions with a "left" indicator are regarded as complementary directions. Each default direction has a corresponding complementary direction at a phase difference of $\pi$ (180°), with the complementary direction carrying the same 2-bit information as the corresponding default direction. For example, a default direction representing (0,1)right with a corresponding complementary direction representing (1,0)left substantially carry the same 2-bit information.

In FIG. 6, the $2\pi$ phase space is evenly divided into 8 directions, 0, $\pi/4$, $\pi/2$, $3\pi/4$, $\pi$, $-3\pi/4$, $-\pi/2$, $-\pi/4$, represented by (0,0)right, (0,1)right, (0,0)left, (0,1)left, (1,1)left, (1,0)left, (1,1)right, and (1,0)right respectively.

Figure 7:
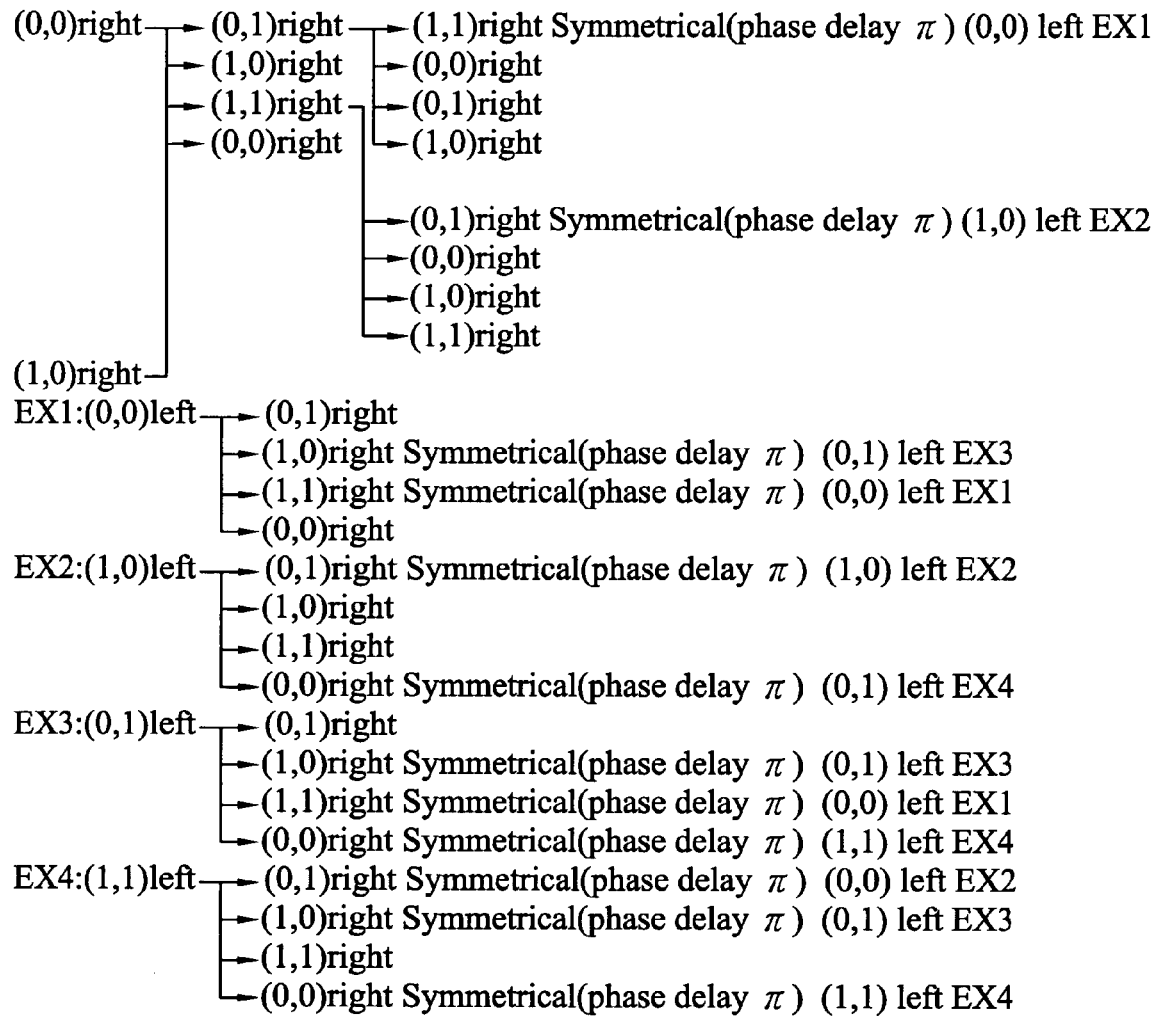
FIG. 7 shows possible combinations for data modulation according to embodiments of the invention.
Figure 8B:
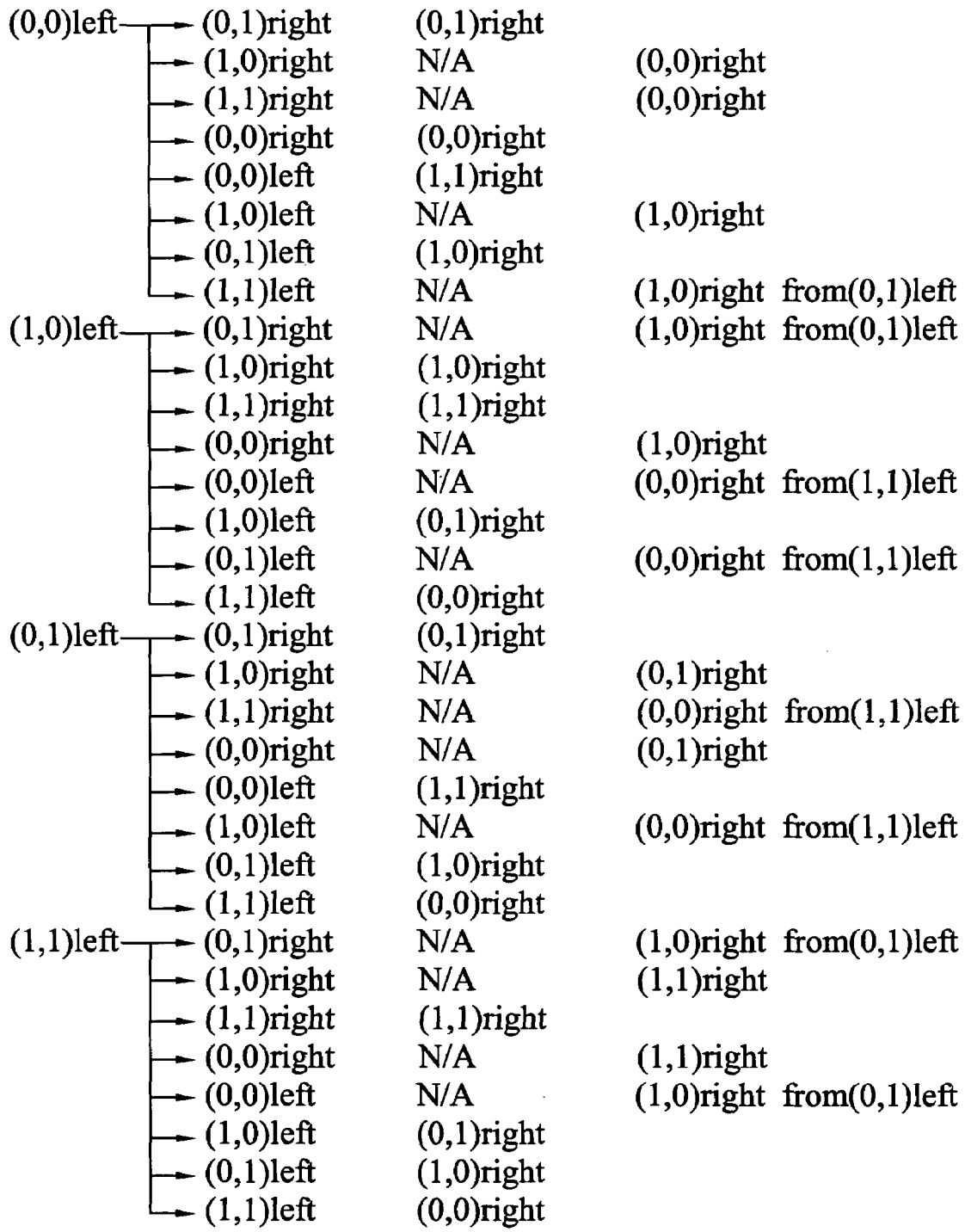

FIGS. 7 and 8a~8b follow the symbol arrangement of the SPSK constellation diagram shown in FIG. 6. Both FIGS. 7 and 8a~8b illustrate assignment of right as the default direction and left as the complementary direction. FIG. 7 shows possible combinations of selection direction for modulation. A current direction is initially selected from the 4 default directions with a "right" indicator, and only changes to a corresponding complementary direction with a "left" indicator if the phase difference between the current direction and its previous direction exceeds $\pi/2$ (90°). As shown in FIG. 7, if a first symbol is either (0,0) or (1,0), the direction of a second symbol can be transmitted in one of the default directions. If the direction of the second symbol is (0,1)right and a third symbol is (1,1), the direction of the third symbol is not (1,1)right among the default directions, but the corresponding complementary direction (0,0)left with a phase delay of $\pi$,, due to phase difference between default directions (0,1)right and (1,1)right exceeding $\pi/2$ as shown in FIG. 6. Similarly, if a forth symbol is (1,0), the direction thereof is a complementary direction (0,1)left of (1,0)right since the phase difference between (0,0)left and (1,0)right exceeds $\pi/2$.

FIGS. 8a and 8b illustrate possible decoding conditions for demodulated symbols received at the receiving end. Decoding of a current symbol requires knowledge of a previous symbol, and the first column in FIGS. 8a~8b lists the 8 possible previous symbols. The second column lists 8 possible current symbols for each previous symbol. The previous and current symbols comprise 2-bit information and 1-bit indicator shown as either left or right. The third column shows the corresponding decoded 2-bit information for each received current symbol. The decoded 2-bit information is obtained by mapping each complementary direction (left) into its corresponding default direction (right), for example, mapping a received current symbol (1,0)left into (0,1)right if the previous symbol is (1,1)right. There are only 4 current directions for each previous direction considered allowable transition directions. The allowable transition directions are defined as directions (either default or complementary) having a phase difference less than $\pi/2$ and a default direction having a phase difference equal to $\pi/2$. The remaining 4 directions not within the allowable transition directions are marked as N/A in the third column denoting an error during data transmission or demodulation. The fourth column shows a most possible allowable direction for each direction not within the allowable transition directions. The most possible allowable direction is determined to be the closest allowable transition direction to the received current symbol. For example, if a previous symbol is (0,0)right and a current symbol is (1,0)left, the corresponding entry in the third column indicates an error since the phase difference between the two directions exceeds $\pi/2$. The corresponding direction in the fourth column is (1,1)right because it is the closest direction to (1,0)left among the four allowable transition directions (0,1)right, (0,0)right, (1,0)right, and (1,1)right.

Similarly, if a previous symbol is (1,1)right and a current symbol is (1,1)left, the corresponding entry in the third column indicates an error since the phase difference between the two directions exceeds $\pi/2$. The corresponding direction in the fourth column is (1,0)left because it is the closest direction to (1,1)left among the four allowable transition directions (1,0)left, (1,1)right, (1,0)right, and (0,0)right. However, (1,0) left is converted to (0,1)right due to the default direction is right. In fact, the symbol (1,0)left and (0,1)right carry the same information to the system according to this invention.

Figure 9A:
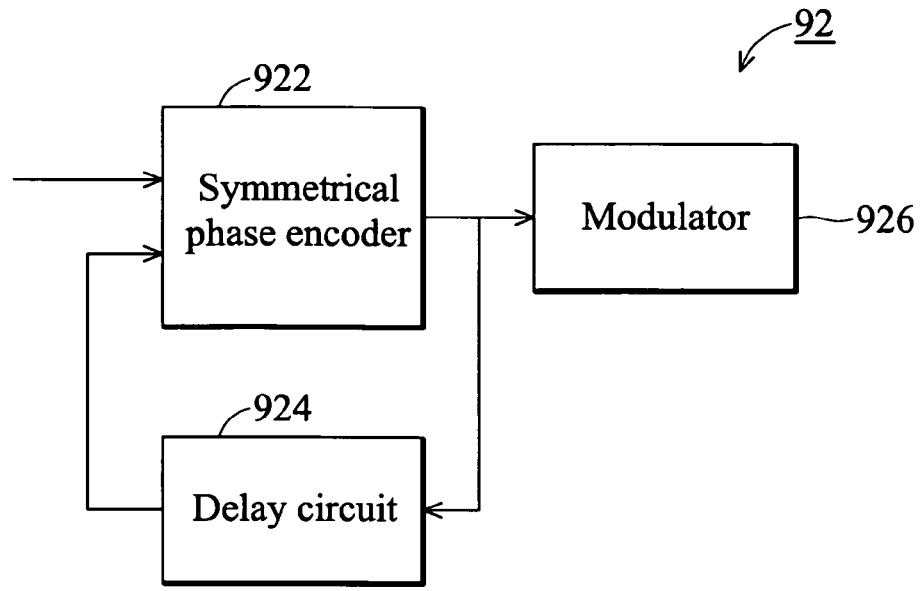
FIGS. 9a and 9b are block diagrams showing a SPSK modulator and a SPSK demodulation according to embodiments of the invention.

FIG. 9a is a schematic block diagram of a SPSK modulator according to embodiments of the invention. The SPSK modulator 92 comprises a symmetrical phase encoder 922, a delay circuit 924, and a modulator 926. n-bit symbols are provided to the symmetrical phase encoder 922 sequentially. The delay circuit 924 obtains the output (direction) of the symmetrical phase encoder 922 and is returned to the symmetrical phase encoder 922 after a one-symbol delay. The symmetrical phase encoder 922 compares a current symbol to a previous direction of a previous symbol provided by the delay circuit 924 to generate a (n+1) bit current direction among $2^{n+1}$ possible directions. The current direction is limited to no more than $\pi/2$ from the previous direction of the previous symbol as two directions spacing $\pi$ carrying the same n-bit information and can be interchangeable to avoid phase shift exceeding $\pi/2$. The current direction is then provided to the modulator 926 and modulated into transmission signal according to the phase specified by the current direction. The modulation method can use any type of phase modulation (PM) or phase shift keying.

Figure 9B:
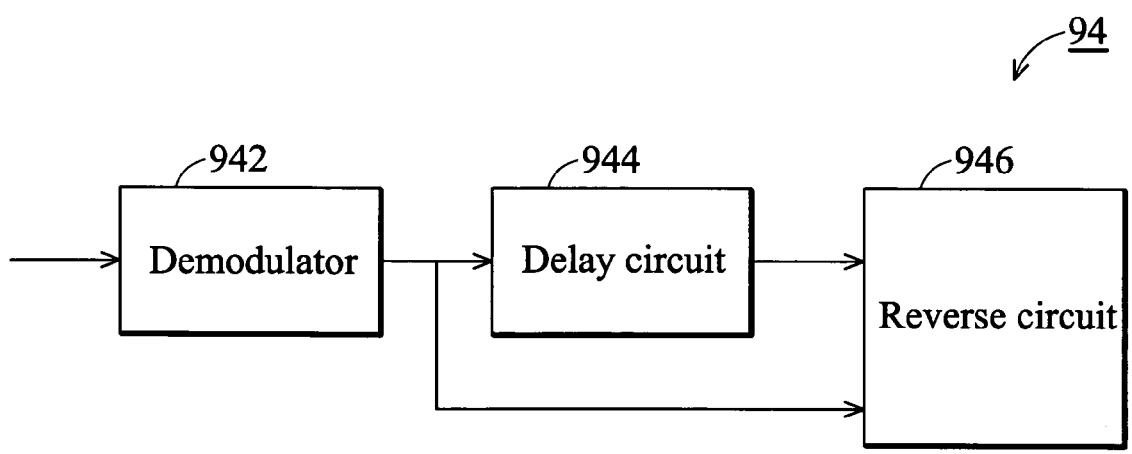

FIG. 9b is a schematic block diagram of a SPSK demodulator according to embodiments of the invention. The SPSK demodulator 94 comprises a demodulator 942, a delay circuit 944, and a reverse circuit 946. The demodulator 942 receives a signal and demodulates (n+1) bit symbols. The output of the demodulator 942 is provided to both the delay circuit 944 and the reverse circuit 946. The reverse circuit 946 obtains a current direction from the demodulator 942 and a previous direction from the delay circuit 944, and decodes a current symbol. An error occurs if the phase difference between the current and the previous directions exceeds $\pi/2$, thus the reverse circuit corrects the current direction by replacing a closest allowable direction less than or equal to $\pi/2$.

The arrangement of symbols on the constellation diagram for SPSK modulation/demodulation methods according to embodiments of the invention is not limited to the constellation diagram shown in FIG. 6, as long as any two directions with a phase difference of $\pi$ are logically contrary but carry the same information. In some embodiments, the SPSK modulation/demodulation methods and apparatuses may reduce the interference by limiting the maximum phase change between successive symbols to be within $\pi/2$.

Finally, while the invention has been described by way of example and in terms of the above, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A symmetrical phase-shift keying (SPSK) method for data modulation, wherein each symbol in a transmission signal carries n-bit information and is transmitted with one of $2^{n+1}$ directions, $2^n$ directions among the $2^{n+1}$ directions regarded as default directions and the other $2^n$ directions regarded as complementary directions, each default direction having a corresponding complementary direction with a phase difference of $\pi$ and representing the same n-bit information as the default direction, the SPSK method comprising:

retrieving one of the default direction corresponding to a current symbol of the transmission signal;

determining whether a phase difference between the retrieved default direction and a previous direction of a previous symbol in the transmission signal is less than or equal to $\pi/2$;

transmitting the current symbol according to the retrieved default direction if the phase difference is less than or equal to $\pi/2$; and transmitting the current symbol according to a complementary direction that corresponds to the retrieved default direction if the phase difference exceeds $\pi/2$.

2. The SPSK method according to claim 1, wherein the $2^{n+1}$ directions are evenly spaced in a $\pi$ phase space.

3. The SPSK method according to claim 1, wherein each symbol carries 2 bits of information (n+2).

4. The SPSK method according to claim 1, wherein the default directions are located in a half plane of a $\pi$ phase space, and the complementary directions are located in the other half plane of the $\pi$ phase space.

5. A symmetrical phase-shift keying (SPSK) method for data demodulation, wherein each symbol in a transmission signal carries n-bit information and is transmitted with one of $2^{n+1}$ directions, $2^n$ directions among the $2^{n+1}$ directions regarded as default directions and the other $2^n$ directions regarded as complementary directions, each default direction having a corresponding complementary direction with a phase difference of $\pi$ and representing the same n-bit information as the default direction, the SPSK method comprising:

recording a previous direction of a previous symbol in the transmission signal, the previous direction having $2^n$ allowable transition directions, having a phase difference from the previous direction less than $\pi/2$ or a default direction with a phase difference from the previous direction of $\pi/2$;

receiving a current symbol with a current direction among the $2^{n+1}$ directions;

determining whether the current direction is among the $2^n$ allowable transition directions;

correcting the current direction to a most possible allowable direction among the $2^n$ allowable transition directions if the current direction is not among the $2^n$ allowable transition directions; and decoding the current symbol to corresponding n-bit information according to the current direction.

6. The SPSK method according to claim 5, wherein the most possible allowable direction among the $2^n$ allowable transition directions is the closest direction with respect to the current direction.

7. A symmetrical phase-shift keying (SPSK) modulator, wherein each symbol carries n-bit information and is transmitted with one of $2^{n+1}$ directions, $2^n$ directions among the $2^{n+1}$ directions regarded as default directions and the other $2^n$ directions regarded as complementary directions, each default direction having a corresponding complementary direction with a phase difference of $\pi$ and representing the same n-bit information as the default direction, the SPSK modulator comprising:

a symmetrical phase encoder, generating a current direction among the $2^{n+1}$ directions for a n-bit current symbol according to a phase difference between the current direction and a previous direction of a previous symbol, wherein the current direction is assigned according to a default direction corresponding to the n-bit current symbol if the phase difference is less than or equal to $\pi/2$, or assigned according to a complementary direction that corresponds to the default direction;

a delay circuit, providing the previous direction to the symmetrical phase encoder by delaying the output of the symmetrical phase encoder; and a modulator, receiving the current direction from the symmetrical phase encoder and modulating the current direction into a signal for transmission by phase-shift keying.

8. The SPSK modulator according to claim 7, further comprising a serial to parallel converter with 1 input and n outputs providing n-bit symbol to the symmetrical phase encoder.

9. A symmetrical phase-shift keying (SPSK) demodulator, wherein each symbol in a received signal carries n-bit information and is transmitted with one of $2^{n+1}$ directions, $2^n$ directions among the $2^{n+1}$ directions regarded as default directions and the other $2^n$ directions regarded as complementary directions, each default direction having a corresponding complementary direction with a phase difference of $\pi$ and representing the same n-bit information as the default direction, the SPSK demodulator comprising:

a demodulator, demodulating the received signal into (n+1) bit symbols;

a delay circuit coupled to the demodulator; and a reverse circuit, receiving a current symbol from the demodulator and a previous symbol from the delay circuit, a previous direction of the previous symbol having $2^n$ allowable transition directions, having a phase difference from the previous direction less than $\pi/2$ or a default direction with a phase difference from the previous direction equals to $\pi/2$, correcting the current direction to a most possible direction if the current direction is not among the $2^n$ allowable transition directions, and decoding the current symbol to corresponding n-bit information according to the current direction.

10. The SPSK demodulator according to claim 9, wherein the reverse circuit determines the closest direction with respect to the current direction as the most possible allowable direction among the $2^n$ allowable transition directions.

11. A symmetrical phase-shift keying (SPSK) method for data modulation, comprising:
   receiving a digital data stream in serial type;
   encoding a current pattern based on a current n-bit information, a previous pattern and a default pattern, wherein the current n-bit information retrieved from the digital data stream, and the previous pattern is delayed for a predetermined cycle, and wherein the default pattern is selected from a group comprising a first bit representing a first half plane of a $\pi$ plane and a second bit representing a second half plane of the $\pi$ plane not overlapping the first half plane;
   modulating a current symbol based on the current pattern; and
   transmitting the current symbol;
   wherein a phase difference between the current symbol and a previous symbol modulated based on the previous pattern is less than or equal to $\pi/2$.

12. The method according to claim 11, further comprises converting the digital data stream into n-bit parallel type.

13. The method according to claim 11, further comprises converting the digital data stream into 2-bit parallel type.

14. The method according to claim 11, wherein the previous symbol is transmitted successively before the current symbol.

15. A symmetrical phase-shift keying (SPSK) method for data demodulation, comprising:
   receiving a current symbol;
   demodulating the current symbol to a current pattern;
   correcting the current pattern to adjust a current direction of the current pattern to a most possible allowable direction among a $2^n$ allowable transition directions of a previous direction of a previous pattern of the previous symbol if the current direction is not among the $2^n$ allowable transition directions, wherein the most possible allowable direction among the $2^n$ allowable transition directions is the closest direction with respect to the current direction; and
   retrieving a current n-bit information by decoding the current pattern;
   wherein a phase difference between the current symbol and a previous symbol is less than or equal to $\pi/2$;
   wherein the previous symbol is transmitted successively before the current symbol 16. The method according to claim 15, wherein the step of correcting the current pattern is based on the previous pattern delayed for a predetermined cycle.

17. A symmetrical phase-shift keying (SPSK) apparatus for data modulation, comprising:
   a symmetrical phase encoder, receiving a digital data stream in serial type and encoding a current pattern based on a current n-bit information, a previous pattern and a default pattern, wherein the current n-bit information retrieved from the digital data stream
   a delay circuit, delaying the previous pattern for a predetermined cycle;
   a modulator, modulating a current symbol based on the current pattern;
   wherein the phase difference between the current symbol and a previous symbol modulated based on the previous pattern is less than or equal to $\pi/2$, and wherein the current pattern is encoded by generating a current direction among $2^{n+1}$ directions for the current n-bit information according to the phase difference, wherein the current direction is assigned according to a default direction corresponding to the current n-bit information if the phase difference is less than or equal to $\pi/2$, or assigned according to a complementary direction corresponding to the default direction with $\pi$ phase difference and representing the same n-bit information as the default direction.

18. The apparatus according to claim 17, further comprising a serial to parallel converter with 1 input and n outputs providing n-bit information to the symmetrical phase encoder.

19. A symmetrical phase-shift keying (SPSK) apparatus for data demodulation, comprising:
   a demodulator, receiving a current symbol and demodulating the current symbol to a current pattern;
   a delay circuit, delaying a previous pattern for a predetermined cycle; and
   a reverse circuit, correcting the current pattern based on the previous pattern by adjusting a current direction of the current pattern to a most possible allowable direction among a $2^n$ allowable transition directions of a previous direction of the previous pattern if the current direction is not among the $2^n$ allowable transition directions, wherein the most possible allowable direction among the $2^n$ allowable transition directions is the closest direction with respect to the current direction, decoding the current pattern and outputting a current n-bit information;
   wherein a phase difference between the current symbol and a previous symbol is less than or equal to $\pi/2$;
   wherein the previous symbol is transmitted successively before the current symbol.

20. The apparatus according to claim 19, wherein the reverse circuit is configured to compare the current pattern and the previous pattern for correcting the current pattern and retrieving the current n-bit information by decoding the current pattern.

21. The method according to claim 11, wherein the current pattern is encoded with one of $2^{n+1}$ directions, wherein $2^n$ directions among the $2^{n+1}$ directions are regarded as default directions and the other $2^n$ directions are regarded as complementary directions, each default direction has a corresponding complementary direction with a phase difference of $\pi$ and representing the same n-bit information as the default direction, the step of encoding the current pattern further comprising:
   retrieving one of the default direction corresponding to the current n-bit information;
   obtaining the current pattern according to the retrieved default direction when the phase difference is less than or equal to $\pi/2$; and
   obtaining the current pattern according to a complementary direction that corresponds to the retrieved default direction when the phase difference exceeds $\pi/2$.

22. The apparatus according to claim 17, wherein the default pattern is selected from a group comprising: a first bit representing a first half plane of a $2\pi$ plane and a second bit representing a second half plane of the $2\pi$ plane not overlapping the first half plane.

* * * * *